US008498828B2

(12) United States Patent
Sasaki (10) Patent No.: US 8,498,828 B2
(45) Date of Patent: Jul. 30, 2013

(54) CALCULATING DEVICE AND FLOW METER EQUIPPED WITH CALCULATING DEVICE

(75) Inventor: Hiroshi Sasaki, Tokyo (JP)

(73) Assignee: Azbil Corporation, Tokyo (JP)

( * ) Notice: Subject to any disclaimer, the term of this patent is extended or adjusted under 35 U.S.C. 154(b) by 314 days.

(21) Appl. No.: 12/943,276

(22) Filed: Nov. 10, 2010

(65) Prior Publication Data

US 2011/0218742 A1 Sep. 8, 2011

(30) Foreign Application Priority Data

Mar. 3, 2010 (JP) ................................ 2010-046682

(51) Int. Cl.
*G06F 19/00* (2011.01)
*G01F 1/00* (2006.01)

(52) U.S. Cl.
USPC ............................................................ 702/45

(58) Field of Classification Search
USPC ................................................. 702/45, 72, 77
See application file for complete search history.

(56) References Cited

U.S. PATENT DOCUMENTS

2003/0076984 A1 4/2003 Tisse et al.
2005/0288873 A1* 12/2005 Urdaneta et al. ................ 702/45

FOREIGN PATENT DOCUMENTS

| CN | 1078552 A | 11/1993 |
|---|---|---|
| CN | 1196483 A | 10/1998 |
| CN | 101473528 A | 7/2009 |
| JP | 2002-243514 A | 8/2002 |
| WO | 93/20411 | 10/1993 |

OTHER PUBLICATIONS

A Chinese Office Action dated Aug. 10, 2012 issued by the State Intellectual Property Office (SIPO) during the prosecution of CN 201010545732.0, which corresponds to the present application.

* cited by examiner

*Primary Examiner* — Bryan Bui
(74) *Attorney, Agent, or Firm* — Troutman Sanders LLP (57) ABSTRACT

The calculating device has first and second Fourier transform portions performing Fourier transforms on two respective inputted signals; a complex conjugate deriving portion deriving a complex conjugate of a value outputted from the first Fourier transform portion; a multiplier multiplying the complex conjugate with the value outputted from the second Fourier transform portion, and outputting the value after the multiplication; a Hilbert transform portion performing a Hilbert transform on the value after multiplication; first and second inverse Fourier transform portions performing respective inverse Fourier transforms on the value after multiplication and the value outputted from the Hilbert transform portion; a phase relationship deriving portion deriving a phase relationship between the two inputted signals based on the values outputted from the first and second inverse Fourier transform portions; and a time difference deriving portion deriving a time difference between the two inputted signals based on the phase relationship.

4 Claims, 8 Drawing Sheets

Background Art

FIG. 11

Background Art

FIG. 12

Background Art

FIG. 13

Background Art

FIG. 14

Background Art

FIG. 15

Background Art

FIG. 16

Background Art

CALCULATING DEVICE AND FLOW METER EQUIPPED WITH CALCULATING DEVICE

CROSS REFERENCE TO RELATED APPLICATIONS

The present application claims priority under 35 U.S.C. §119 to Japanese Patent Application No. 2010-046682, filed Mar. 3, 2010, which is incorporated herein by reference.

FIELD OF TECHNOLOGY

The present invention relates to a calculating device used as, for example, a portion of a structure of a flow meter, and relates to, for example, a calculating device able to derive a time difference between a first inputted signal and a second inputted signal that has a delay relative to the first inputted signal.

BACKGROUND OF THE INVENTION

Figure 10:
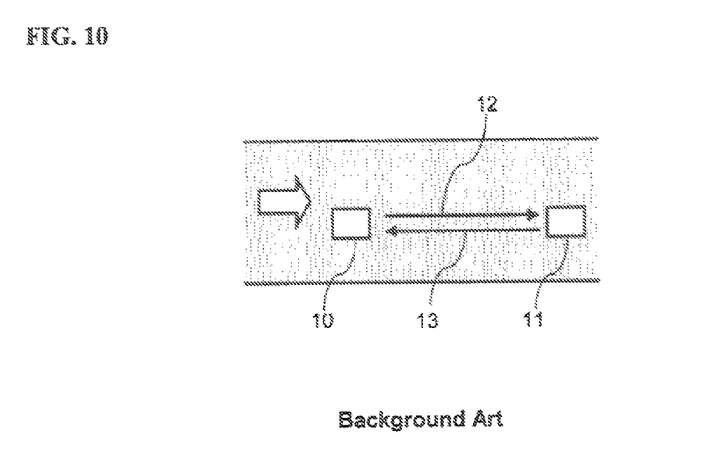
FIG. 10 is a diagram showing an example of a structure of an ultrasonic flow meter.

As one flow meter there is an ultrasonic flow meter that uses the difference in propagation times produced when an ultrasonic wave propagates within a medium. As illustrated in FIG. 10, for example, the ultrasonic flow meter has ultrasonic transceivers 10 and 11 disposed in a flow path, and measures the speed of flow of a medium, such as a gas or a liquid, that flows in the flow path, based on the difference in propagation times between the propagation time of a received signal 12 that is received on the downstream side when an ultrasonic wave is transmitted from the upstream side, and the propagation time of a received signal 13 that is received on the upstream side when an ultrasonic wave is transmitted from the downstream side.

Figure 11:
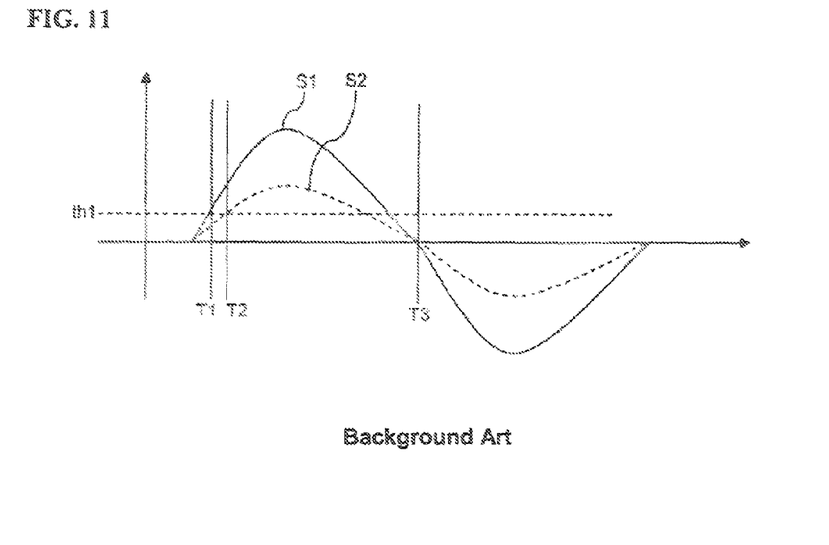
FIG. 11 is a waveform diagram illustrating the conventional operation of the ultrasonic flow meter.

In the measurement of the difference in the propagation times, it is necessary to have a resolution in the order of nanoseconds or sub-nanoseconds. On the other hand, the ultrasonic waves used in ultrasonic flow meters have frequencies in the order of tens of kilohertz through 1 MHz, and thus the period of the signals is in excess of 1 μs, and thus the measured propagation times are susceptible to the influence of noise. However, the amplitude of the ultrasonic waves is affected by the speed of flow and state of flow of the medium within the flow path. Consequently, when the arrival of the ultrasonic wave is evaluated through setting a threshold value for the received signal, the arrival time that is measured will vary depending on the change in the amplitude of the received signal. That is, as illustrated in FIG. 11, in contrast to the time of arrival of the received signal S1, having a normal amplitude, at the threshold value TH1 being T1, the time of arrival of the received signal S2, having a smaller amplitude, at the threshold value TH1 will be T2.

Given this, there is a correlation method as a method for measuring that is not influenced by the change in the amplitude of the received signal. In the correlation method, the correlation between the received signal 12 that is transmitted from the ultrasonic transceiver 10 on the upstream side and received by the ultrasonic transceiver 11 on the downstream side and the received signal 13 that is transmitted by the ultrasonic transceiver 11 on the downstream side and received by the ultrasonic transceiver 10 on the upstream side is calculated, to calculate the difference in the propagation time from the position of the peak (the position of the maximum) of the correlation. This correlation is calculated through digital signal processing, and thus is caused to be discreet, with intervals that are the same as the sampling period of the received signals. While, as described above, the measurement of the difference in the propagation times requires an accuracy in the order of nanoseconds or sub-nanoseconds, the sampling frequency is, at most, in the order of tens of megahertz (where the sampling period is in the order of tens of nanoseconds), and thus it is necessary to perform interpolation of the discrete signals in order to measure the difference in propagation times with adequate accuracy.

Figure 12:
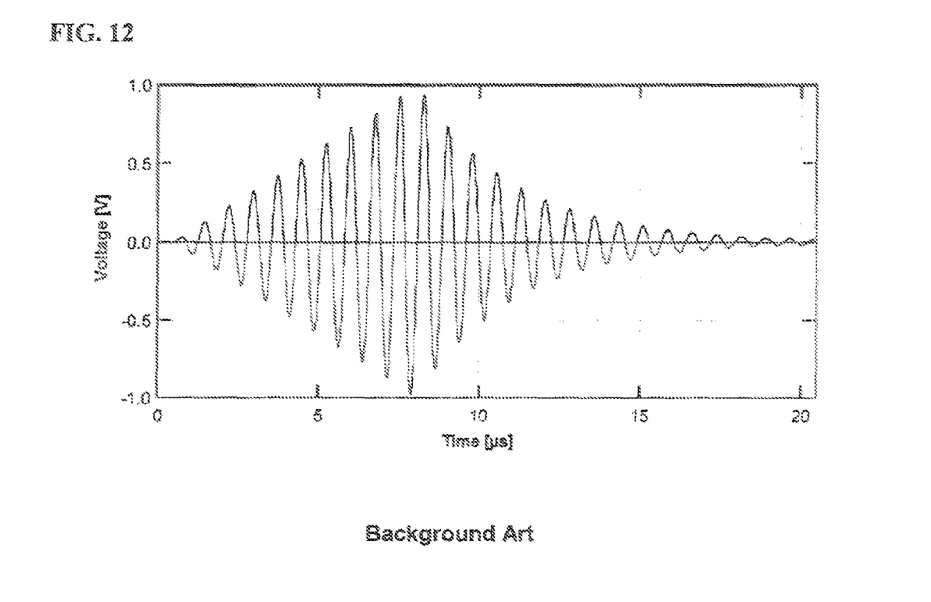
FIG. 12 is a waveform diagram of the received signal.
Figure 13:
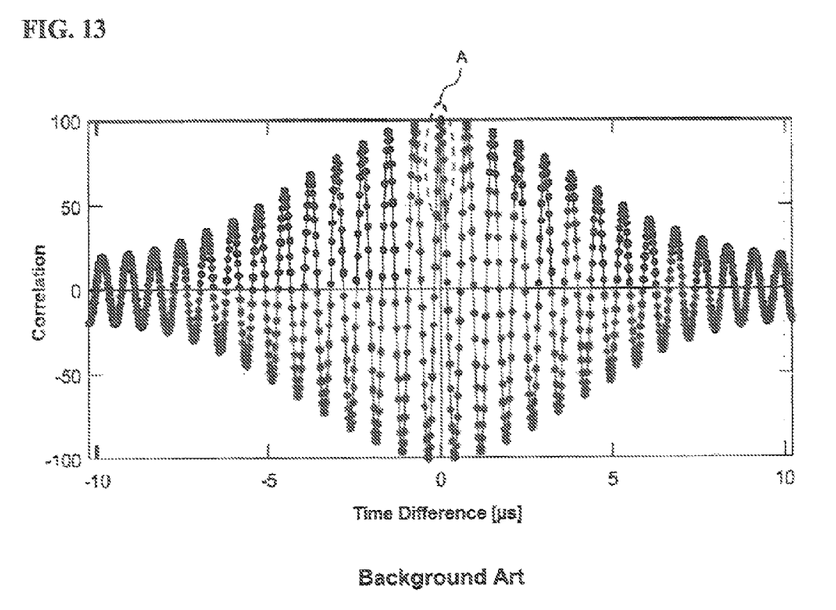
FIG. 13 is a graph illustrating the correlations between the first received signal and the second received signal.
Figure 14:
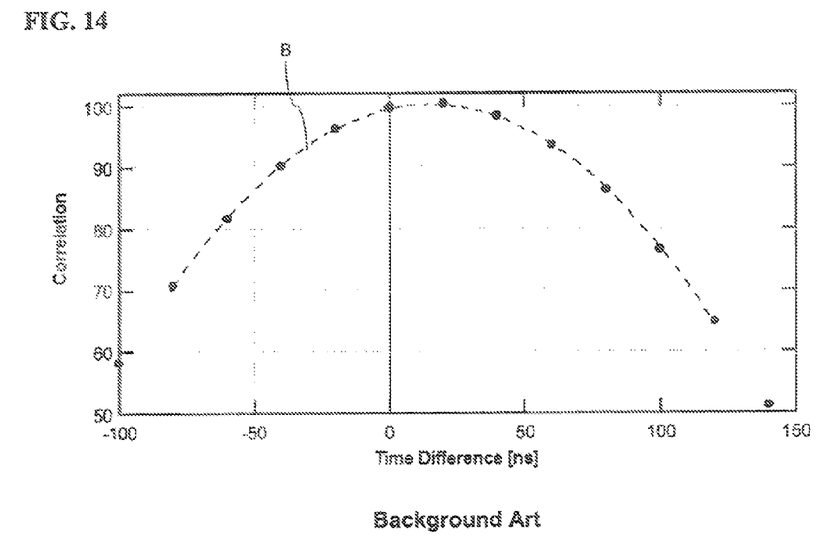
FIG. 14 is a graph showing a partial enlargement of the correlations between the first received signal and the second received signal.
Figure 15:
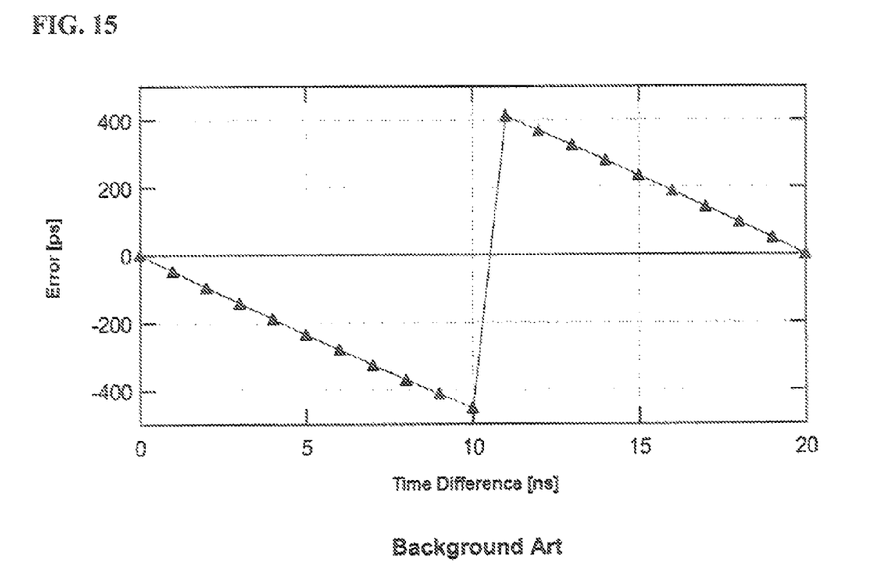
FIG. 15 is a graph showing the error between the actual correlations and the correlations calculated through interpolation.

If the transmitted signal of the ultrasonic wave is a burst wave comprising a signal of several periods wherein the frequency and the amplitude are held constant, then, as illustrated in FIG. 12, the received signal will have a waveform that has periodicity and wherein the amplitude changes. Consequently, the correlation function between the aforementioned two signals will have a strong component at the frequency of the burst wave. Because of this, the correlation function will have a form near to that of a trigonometric function, where the position of the peak can be interpolated using a quadratic function as an approximation. However, even when interpolating using a quadratic function, still there will be error between the value calculated using interpolation and the value that should actually be calculated. For example, let us assume that a correlation such as illustrated in FIG. 13 has been obtained for a sampling period of 20 ns. FIG. 14 shows an enlargement of the waveform in the vicinity of A in FIG. 13, which is the position of the peak of the correlation. FIG. 14 illustrates the discrete correlation functions indicated by the plot, and the curve, indicated by the dotted line, obtained through interpolation of the discrete correlation functions using quadratic functions. Note that in FIG. 13 and FIG. 14 the correlations were calculated using the signals received by producing to receive signals with a 15 ns time difference therebetween, and, from FIG. 14, it can be seen that there is a correlation peak in the vicinity of 15 ns. FIG. 15 shows, on the horizontal axis, the time difference between the two received signals, showing the position of the peak, derived from the interpolated correlation characteristics, and the error from the actual time difference, where it can be understood that, at the maximum, an error of more than 400 ps (0.4 nanoseconds) is produced. As mentioned previously, it is necessary to have a resolution in the order of nanoseconds or sub-nanoseconds in the difference between propagation times, so an error of 400 ps will negatively affect the measurement results. On the other hand, if a higher-order correlation were used for the interpolation, the interpolation formula would become complex, and would not be practical.

Given this, there is a method of calculating the position of the peak of the correlations using a Hilbert transform. (See, Japanese Unexamined Patent Application Publication 2002-243514 ("JP '514")). This method enables the calculation of the peak position through a linear approximation, enabling the error to be reduced relative to interpolation using a quadratic function.

Figure 16:
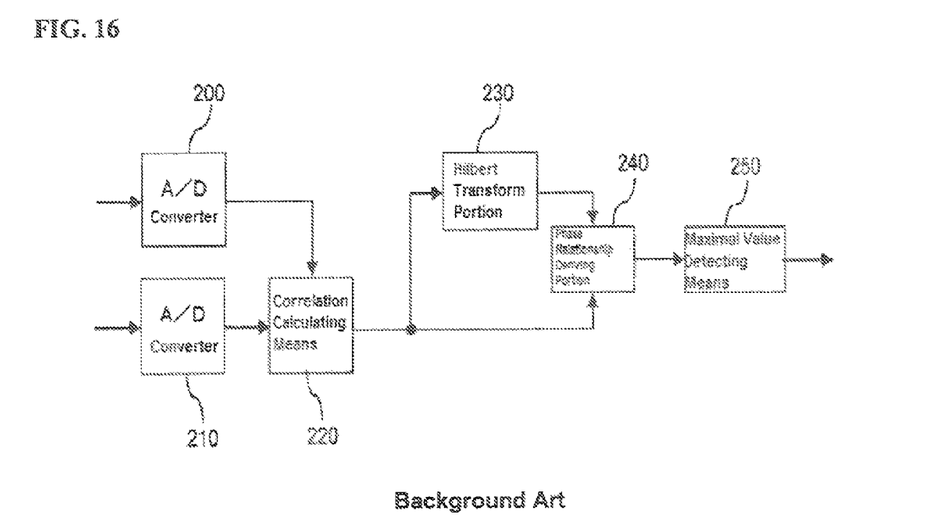
FIG. 16 is a diagram illustrating an example of a structure of a conventional calculating device.

In the conventional technology disclosed in JP '514, the structure is one wherein a Hilbert transform is performed after calculating the correlations, and the position of the peak of the correlations is detected based on the positional relationships, to thereby derive the time difference. Specifically, the structure comprises A/D converters 200 and 210, correlation calculating means 220, a Hilbert transform portion 230, a phase relationship deriving portion 240, and maximal value detecting means 250, as illustrated in FIG. 16. However, this structure has a problem in that the computational overhead is too great.

Given this, in one form of embodiment according to the present invention, one object is to provide a calculating device that can reduce the computational overhead, even when calculating the difference in the propagation times with high accuracy, through the use of the Hilbert transform.

SUMMARY OF THE INVENTION

In order to solve this problem, a calculating device, as one form of the present invention, includes a first Fourier transform portion for performing a Fourier transform on a first inputted signal; a second Fourier transform portion for performing a Fourier transform on a second inputted signal; a complex conjugate deriving portion for deriving a complex conjugate of the value outputted from the first Fourier transform portion; a multiplier for multiplying the complex conjugate by the value outputted from the second Fourier transform portion, and for outputting the value after the multiplication; a Hilbert transform portion for performing a Hilbert transform on the value after the multiplication; a first inverse Fourier transform portion for performing an inverse Fourier transform on the value after multiplication; a second inverse Fourier transform portion for performing an inverse Fourier transform on the value outputted from the first inverse Fourier transform portion; a phase relationship deriving portion for deriving a phase relationship between the first inputted signal and the second inputted signal based on the value outputted from the first inverse Fourier transform portion and the value outputted from the second inverse Fourier transform portion; and a time difference deriving portion for deriving the time difference between the first inputted signal and the second inputted signal based on the phase relationship.

The calculating device with this structure performs an inverse Fourier transform after having performed a Hilbert transform on a value that has undergone a Fourier transform, making it possible to calculate with a relatively small computational overhead the time difference between the first inputted signal and the second inputted signal. Moreover, because the computational overhead is small, this enables a reduction in the processing time of the calculating device, enabling the calculating device to be structured at a low cost. Note that the time difference between the first inputted signal and the second inputted signal corresponds to the difference in propagation times of the signals in a flow meter.

Additionally, a calculating method, as a form of the present invention, has a first Fourier transform step for performing a Fourier transform on a first inputted signal; a second Fourier transform step for performing a Fourier transform on a second inputted signal; a complex conjugate deriving step for deriving a complex conjugate of the value obtained in the first Fourier transform step; a multiplying step for multiplying the complex conjugate by the value outputted obtained in the second Fourier transform step, and for outputting the value after the multiplication; a Hilbert transform step for performing a Hilbert transform on the value after the multiplication; a first inverse Fourier transform step for performing an inverse Fourier transform on the value after multiplication; a second inverse Fourier transform step for performing an inverse Fourier transform on the value obtained in the first inverse Fourier transform step; a phase relationship deriving step for deriving a phase relationship between the first inputted signal and the second inputted signal based on the value obtained in the first inverse Fourier transform step and the value obtained in the second inverse Fourier transform step; and a time difference deriving step for deriving the time difference between the first inputted signal and the second inputted signal based on the phase relationship.

Furthermore, the present invention includes a flow meter provided with the calculating device set forth above. More specifically, the flow meter is further provided with a first signal transceiver and a second signal transceiver structured so as to be able to send signals to each other and receive signals from each other, where the first signal transceiver and the second signal transceiver are provided at a distance from each other in a flow path wherein a specific medium flows, structured so that the aforementioned first inputted signal is the signal that is transmitted from the second signal transceiver and received by the first signal transceiver and the second inputted signal is the signal that is transmitted from the first signal transceiver and received by the second signal transceiver, and the flow rate of the medium is calculated based on the aforementioned time difference that is derived.

The calculating device of the one form of the present invention enables the calculation, with a relatively small computational overhead, of the difference in propagation times between the received signal on the upstream side and the received signal on the downstream side, in an ultrasonic flow meter, for example, provided with ultrasonic transceivers on the upstream side and on the downstream side.

DETAILED DESCRIPTION

One form of example according to the present invention is explained in detail following the structure below while referencing the drawings. Note that the form of embodiment that is explained below is no more than one example of the present invention, and the scope of technology of the present invention is not limited thereto. Note that in each of the drawings, identical components are assigned identical codes, and in some cases explanations thereof may be omitted.

1. DEFINITIONS

First terminology used in the present specification is defined as follows.

"XX portion": While this includes components that are structured from electrical circuits, and the like, there is no limitation thereto, and this also includes physical means for achieving the function of the portion, functional means that are achieved through software, and the like. Furthermore, a function of a single component may be achieved through two or more physical or functional means, and functions of two or more components may be achieved through single physical or functional means.

2. EXAMPLE OF A STRUCTURE OF A CALCULATING DEVICE

One example of a form of the present invention is a calculating device that is used as a portion of a structure of a flow meter, such as an ultrasonic flow meter, having, as one distinctive feature, a structure wherein a Hilbert transform is performed on a value that has been subjected to a Fourier transform, after which an inverse Fourier transform is performed. An example of a structure of a calculating device according to the present invention will be explained first, in reference to the drawings.

Figure 1:
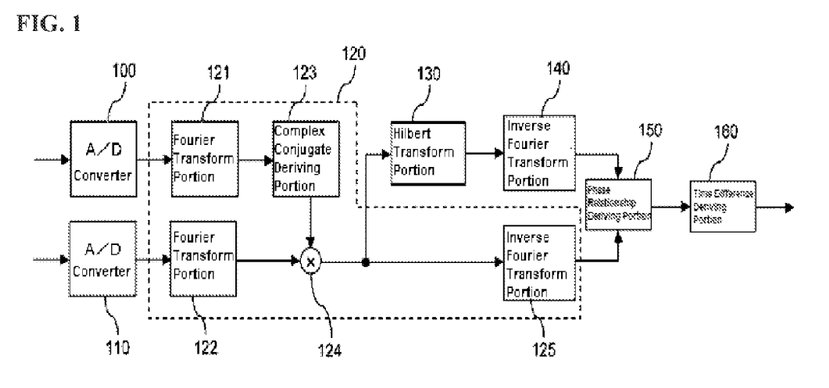
FIG. 1 is a diagram illustrating an example of a structure of a calculating device in an example.

FIG. 1 is a diagram illustrating an example of a structure of a calculating device. As illustrated in FIG. 1, the calculating device is structured including A/D converters 100 and 110, a correlation calculating portion 120, a Hilbert transform portion 130, an inverse Fourier transform portion 140, a phase relationship deriving portion 150, and a time difference deriving portion 160.

The A/D Converters 100 and 110

The A/D converter 100 is structured so as to input a first analog signal and to generate and output a first digital signal through sampling this analog signal at a specific frequency. Here the first analog signal, as illustrated in FIG. 10, is a received signal 12 that is transmitted from an ultrasonic transceiver 10 that is disposed on the upstream side and received by an ultrasonic transceiver 11 that is disposed on the downstream side. The received signal 12, as illustrated in FIG. 12, for example, is a waveform having periodicity and wherein the amplitude changes.

The A/D converter 110 is structured so as to input a second analog signal and to generate and output a second digital signal through sampling this analog signal at a specific frequency. Here the second analog signal, as illustrated in FIG. 10, is a received signal 13 that is transmitted from the ultrasonic transceiver 11 that is disposed on the downstream side and received by the ultrasonic transceiver 10 that is disposed on the upstream side. Because the received signal 13 is the signal that is transmitted from the downstream side to the upstream side, it is a signal that is delayed, when compared with the received signal 12, by the effects of the medium that flows in the flow path.

Correlation Calculating Portion 120

The correlation calculating portion 120 is structured so as to be able to derive, based on the first digital signal and the second digital signal outputted from the A/D converters 100 and 110, the correlations between these two signals. It is further structured so as to enable outputting of values in the process of deriving the correlations. Specifically, the correlation calculating portion 120 is structured including Fourier transform portions 121 and 122, a complex conjugate deriving portion 123, a multiplier 124, and an inverse Fourier transform portion 125.

The Fourier transform portion 121 is structured so as to perform a Fourier transform on the first digital signal that is the output from the A/D converter 100, and to output the value after the Fourier transform. The Fourier transform portion 122 is structured so as to perform a Fourier transform on the second digital signal that is the output from the A/D converter 110, and to output the value after the Fourier transform. Note that while both the Fourier transform portions 121 and 122 in the present form perform fast Fourier transforms (FFT), there is not necessarily any limitation thereto.

The complex conjugate deriving portion 123 is structured so as to have the ability to derive a complex conjugate of the value that is outputted based on the value that is outputted from the Fourier transform portion 121.

The multiplier 124 is structured so as to be able to multiply the complex conjugate that is the output of the complex conjugate deriving portion by the value outputted from the Fourier transform portion 122, and so as to have the ability to output the value after multiplication.

The inverse Fourier transform portion 125 is structured so as to perform an inverse Fourier transform on the value after multiplication, outputted by the multiplier 124, and so as to output the value after the inverse Fourier transform. The value after the inverse Fourier transform indicates the correlation between the first digital signal and the second digital signal.

The Hilbert Transform Portion 130

The Hilbert transform portion 130 is structured so as to perform a Hilbert transform in the frequency domain on the value after multiplication, outputted from the multiplier 124 that is one of the structures of the correlation calculating portion 120.

The Inverse Fourier Transform Portion 140

The inverse Fourier transform portion 140 is structured so as to perform an inverse Fourier transform on the value that is outputted from the Hilbert transform portion 130, and to output the value after the inverse Fourier transform.

The Phase Relationship Deriving Portion 150

The phase relationship deriving portion 150 is structured so as to enable the derivation of the phase relationship between the first digital signal that is the output from the A/D converter 100 and the second digital signal that is the output of the A/D converter 110, based on the value outputted from the correlation calculating portion 120 (the value outputted from the inverse Fourier transform portion 125) and the value outputted from the inverse Fourier transform portion 140. This phase relationship corresponds to the phase relationship between the first analog signal that is inputted into the A/D converter 100 and the second analog signal that is inputted into the A/D converter 110.

The Time Difference Calculating Portion 160

The time difference deriving portion 160 is structured so as to enable the derivation of the time difference between the first digital signal and the second digital signal (the difference in propagation times) based on the phase relationship derived and outputted by the phase relationship deriving portion 150. This time difference corresponds to the time difference between the first analog signal and the second analog signal (the difference in the propagation times).

The calculating device according to the present invention may be provided further with a flow speed/flow rate deriving portion (not shown), structured so as to enable the derivation of the flow speed and/or flow rate of a medium flowing in a flow path, based on the time difference outputted from the time difference deriving portion 160.

Figure 2:
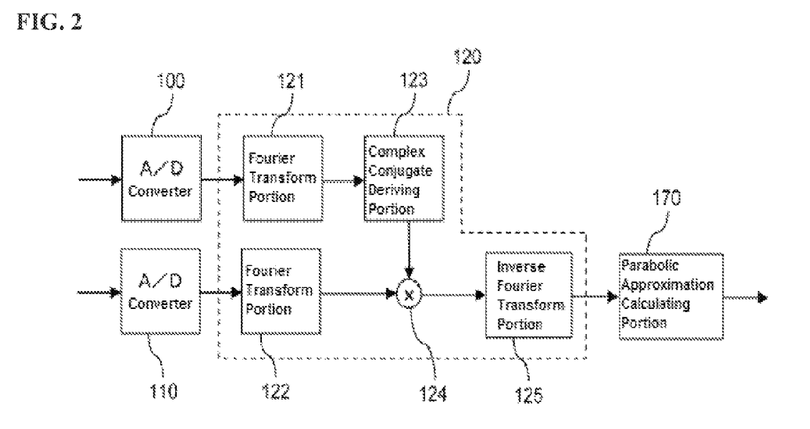
FIG. 2 is a diagram illustrating an example of a structure of a calculating device that does not perform the Hilbert transform.

Comparison with a Calculating Device in the Case Wherein the Hilbert Transform is not Performed FIG. 2 is a diagram illustrating a structure for a calculating device in a case wherein the Hilbert transform is not performed. When compared with FIG. 1, the calculating device of FIG. 2 is not provided with the Hilbert transform portion 130, the phase relationship deriving portion 150 and the time difference deriving portion 160, and is provided with a parabolic approximation calculating portion 170 that inputs the value that is outputted from the inverse Fourier transform portion 125 that is included in the correlation calculating portion 120. In the structure in FIG. 2, the value outputted from the inverse Fourier transform portion 125 is a waveform as illustrated in FIG. 13 and FIG. 14, and the time difference between the first digital signal and the second digital signal is calculated through an approximation using a quadratic function in the parabolic approximation calculating portion 170.

On the other hand, because the calculating device in the present form of embodiment is provided with the Hilbert transform portion 130, it is possible to derive the time difference using a linear approximation, rather than using a quadratic function, as explained in detail below.

3. CALCULATION OF THE CORRELATION PEAK USING THE CALCULATING DEVICE

Here the calculation of the correlation peak using the calculating device illustrated in FIG. 1 will be explained in detail.

The first analog signal that is inputted into the A/D converter 100 of the calculating device is the signal illustrated in FIG. 12, and the second analog signal that is inputted into the A/D converter 110 is delayed relative to the signal illustrated in FIG. 12. Here the signals wherein these first analog signal and second analog signal have undergone A/D conversion are, respectively, the first digital signal and the second digital signal. The calculating device may be structured with these first digital signal and second digital signal as inputted signals.

Figure 3:
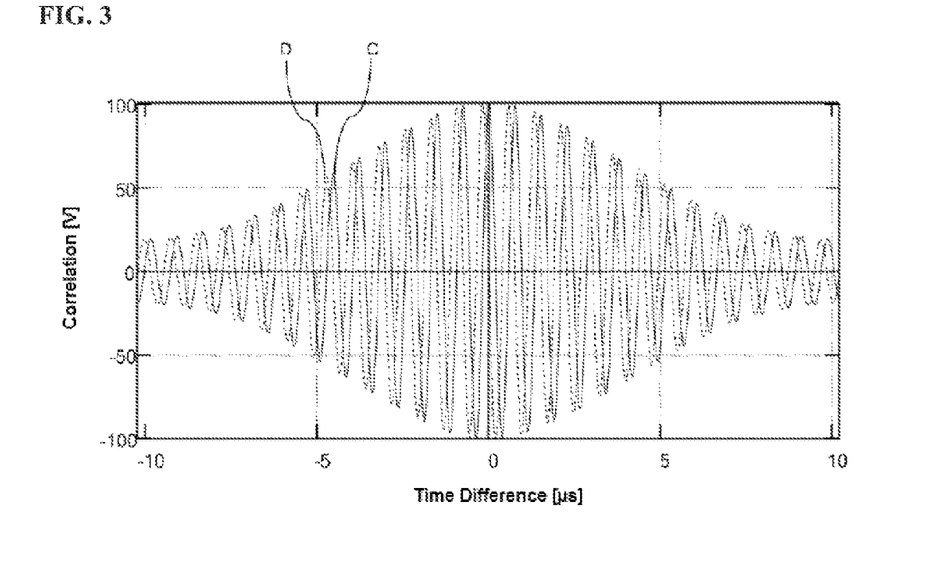
FIG. 3 is a graph showing the values outputted from the respective inverse Fourier transform portions in the calculating device.

The correlations calculated by the correlation calculating portion 120 based on these first digital signal and second digital signal are shown as the Waveform C in FIG. 3. That is, the correlations are the values outputted by the inverse Fourier transform portion 125 of the correlation calculating portion 120. Furthermore, when the correlations are calculated in the correlation calculating portion 120 based on these inputted signals, a Hilbert transform is performed in the frequency domain in the Hilbert transform portion 130 on the value outputted by the multiplier 124, which is a value prior to an inverse Fourier transform being performed, and the result of performing an inverse Fourier transform in the inverse Fourier transform portion 140 is illustrated as waveform D in FIG. 3. That is, in the result of passing through the Hilbert transform and undergoing the inverse Fourier transform (Waveform D), it can be seen that a signal is outputted with a phase that leads by 90° the result of performing the inverse Fourier transform without having passed through the Hilbert transform (Waveform C). Note that while in FIG. 3 the respective values are illustrated as being continuous values, in practice these will be discrete values.

Figure 4:
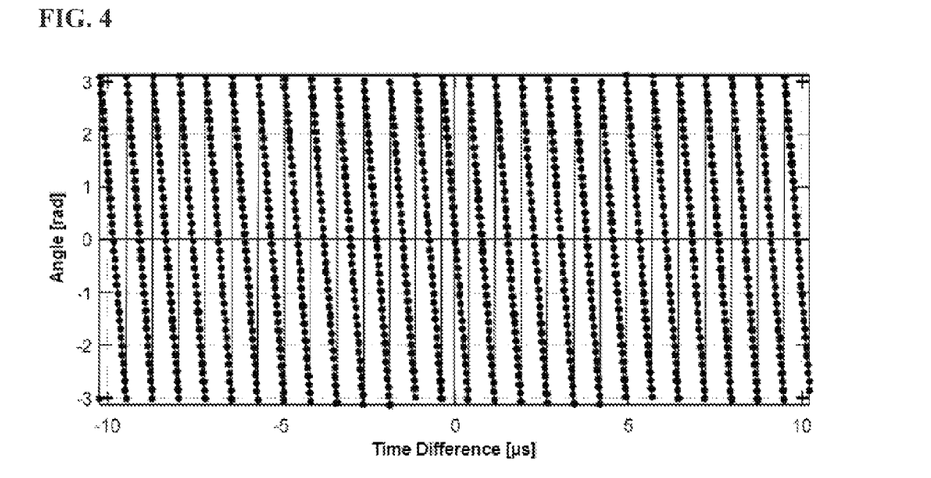
FIG. 4 is a graph showing the phase relationships of the correlations.
Figure 5:
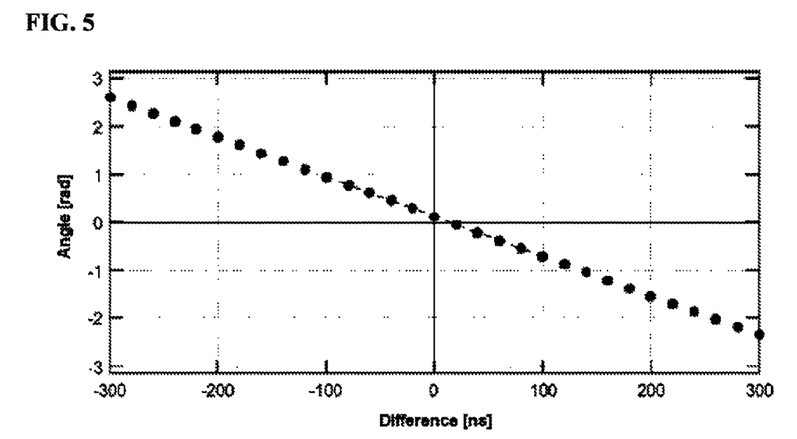
FIG. 5 is a diagram enlarging the graph that shows the phase relationships between the correlations.
Figure 6:
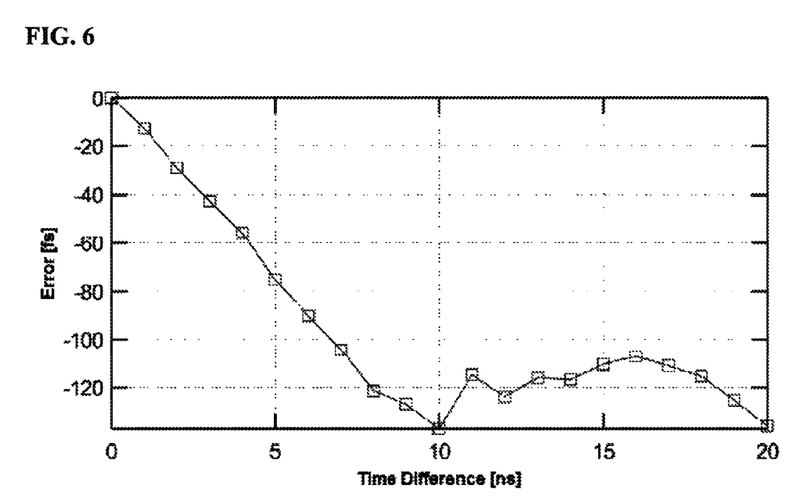
FIG. 6 is a graph showing the interpolation error.

The phase relationship that is calculated in the phase relationship deriving portion 150 based on the value outputted by the inverse Fourier transform portion 125 (corresponding to the Waveform C in FIG. 3) and the value outputted from the inverse Fourier transform portion 140 (corresponding to Waveform D in FIG. 3) is the value that is illustrated in the graph in FIG. 4. FIG. 5 is a graph showing an enlargement of the portion from −300 ns (−0.3 µs) to 300 ns (0.3 µs) for the phase relationships illustrated in FIG. 4. In this graph, the point where the phase relationship is zero is the position of the peak of the correlations. That is, the time difference at the point wherein the phase relationship goes to zero shows the time difference between the first digital signal and the second digital signal. As can be seen from FIG. 4 and FIG. 5, the phase relationships appear linearly on the graph. Consequently, the time difference deriving portion 160 derives, as the time difference between the first digital signal and the second digital signal, the time difference at the point wherein the phase relationship goes to zero through performing interpolation, through linear approximation, of the phase relationships outputted from the phase relationship deriving portion 150. FIG. 6 shows the error in the time differences, relative to the actual time differences, using interpolation in the calculating device in the present form of embodiment. As illustrated in FIG. 6, the error is a maximum of approximately 140 fs, which can be seen to be a level that is negligible even if the resolution of the differences in propagation times is in the order of nanoseconds or sub-nanoseconds. The error becoming this small is because of the lack of tendency for there to be error, even when discrete values are used, because linear approximations are performed for the phases when calculating the phases, due to the use of the Hilbert transform by the calculating device according to the present form of embodiment, treating the waveform as a trigger metric function, rather than by performing approximations through quadratic functions, such as in the calculating device illustrated in FIG. 2, for waveforms that are approximately trigonometric functions.

4. COMPARISON OF THE CALCULATING DEVICE IN THE PRESENT FORM OF EMBODIMENT AND A CONVENTIONAL CALCULATING DEVICE

A comparison will be made next between the computational overhead in the calculation device in the present example, illustrated in FIG. 1, and the computational overhead in the conventional calculating device illustrated in FIG. 16. Here the comparison is made regarding the computational overhead in the part prior to the phase relationship deriving portion 150, which is the part wherein there is a difference between the calculating device according to the present form of embodiment and the conventional calculating device illustrated in FIG. 16. Typically the computational overhead can be considered to be proportional to the number of multiplication calculations, and thus the comparison of the computational overhead will be performed based on a comparison of the number of multiplications. The computational overhead in the calculating device according to the present form is calculated first.

Figure 7:
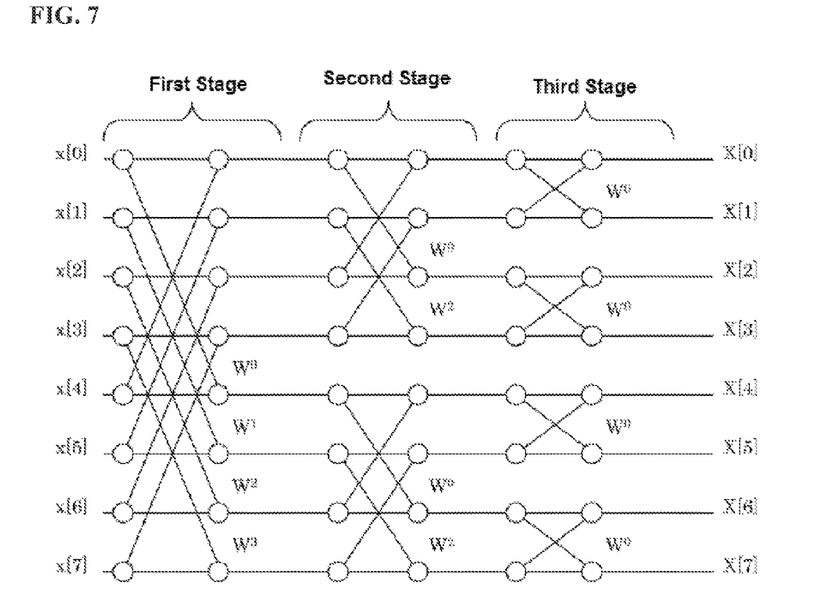
FIG. 7 is a conceptual diagram of the method of the Fourier transform (FFT).
Figure 8:
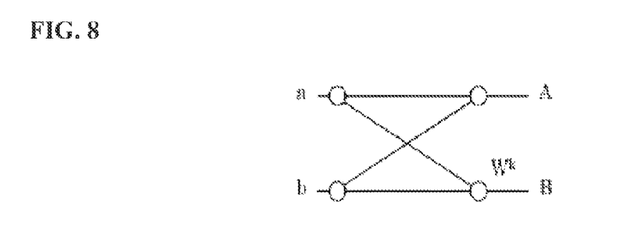
FIG. 8 is a conceptual diagram showing a method for a butterfly calculation.

The number of data respectively for the first digital signal and the second digital signal, which are the inputted signals, are defined as $N\ (=2^n)$. The reason why the number of data is a power of 2 is that the calculation is performed through FFT in the Fourier transform portions 121 and 122. The FFT can be calculated through calculations of n stages corresponding to the number of data N. In FIG. 7, as an example the number of data N in the digital signal that is the inputted signal is 8 ($2^3$), where FIG. 7 is a conceptual diagram of performing an FFT through calculations in first through third stages. FIG. 8 is a diagram illustrating the so-called butterfly calculation that is an element of the conceptual diagram of FIG. 7, where the result of the butterfly calculation is calculated through Equation 1 through Equation 4, below:

$$\begin{pmatrix} A \\ B \end{pmatrix} = \begin{pmatrix} a+b \\ (a-b)W^k \end{pmatrix} \quad \text{[Equation 1]}$$

$$W^k = c[k] - js[k] \quad \text{[Equation 2]}$$

$$c[k] = \cos\left(2\pi \frac{k}{N}\right) \quad \text{[Equation 3]}$$

$$s[k] = \sin\left(2\pi \frac{k}{N}\right) \quad \text{[Equation 4]}$$

As can be understood from Equation 1 and Equation 2, the (a−b) and the $W^k$ in Equation 1 are each complex numbers, where in a single butterfly calculation there is the need for a single multiplication of complex numbers. A single multiplication of complex numbers requires four multiplications of real numbers, as illustrated in Equation 5.

$$xy = (x_r + jx_i)(y_r + jy_i) = x_r y_r - x_i y_i + j(x_r y_i + x_i y_r) \quad \text{[Equation 5]}$$

As illustrated in FIG. 7, the butterfly calculation is performed N/2 times in each stage, and thus 2N multiplications (=N/2×4) are performed in each stage. Consequently, if the number of stages is n, then the number of calculations required for a single FFT is 2 Nn.

On the other hand, when performing a calculation through the inverse FFT in the inverse Fourier transform portions 125 and 140, the computational overhead is identical, because the twiddle factors $W^k$ in the FFT described above merely becomes $W^{-k}$. That is, the number of multiplications required for a single inverse FFT is 2 Nn.

When deriving the complex conjugate in the complex conjugate deriving portion 123, the sign of the imaginary portion is merely inverted, as shown in Equation 6, below, and thus there is no multiplication. Consequently, this can be viewed as there being no computational overhead.

$$(x_r, x_i) \rightarrow (x_r, -x_i) \quad \text{[Equation 6]}$$

When the multiplication is performed in the multiplier 124, the multiplications are as illustrated in Equation 7, below, and thus the number of multiplications is 4N.

$$\sum_{i=1}^{N} x_i y_i = \sum_{i=1}^{N} (x_{i_r} + jx_{i_i})(y_{i_r} + jy_{i_i})$$

$$= \sum_{i=1}^{N} (x_{i_r} y_{i_r} - x_{i_i} y_{i_i} + j(x_{i_r} y_{i_i} + x_{i_i} y_{i_r})) \quad \text{[Equation 7]}$$

The Hilbert transform in the Hilbert transform portion 130, as shown in Equation 8 and Equation 9, below, is performed through merely swapping the order of the imaginary part and the real part and inverting the sign, and thus no multiplication is involved, so this can be viewed as having no computational overhead. Note that Equation 8 is applied for a positive frequency and Equation 9 is applied for a negative frequency.

$$(X_r, X_i) \rightarrow (X_i, -X_r) \quad \text{[Equation 8]}$$

$$(X_r, X_i) \rightarrow (-X_i, X_r) \quad \text{[Equation 9]}$$

From the above, the number of multiplications in the calculating device in the present form of embodiment is calculated as: (the number of multiplications in the Fourier transform portions 121 and 122)+(the number of multiplications in the inverse Fourier transform portions 125 and 140)+(the number of multiplications in the multiplier 124)=2 Nn×2+2 Nn×2+4N=8 Nn+4N.

The computational overhead in the case of using the conventional calculating device, as illustrated in FIG. 16, will be calculated next. First, in the case of calculating the correlation in the correlation calculating means 220, the calculation is through Equation 10, below.

$$X_i = \sum_{j=1}^{N} x_j y_{j+i} \quad (i = 0 \ldots N-1) \quad \text{[Equation 10]}$$

Consequently, the number of multiplications required when calculating the correlation is $N^2$.

Next it is possible to use, for example, a 31-tap FIR filter when performing the Hilbert transform in the Hilbert transform portion 230. The calculation in this case is calculated through Equation 11, below. Note that $k_j$ indicates the coefficient of the FIR filter for the Hilbert transform.

$$X_i = \sum_{j=-15}^{15} k_j x_j \quad (i = 0 \ldots N-1) \quad \text{[Equation 11]}$$

Consequently, the number of multiplications required when performing the Hilbert transform is 31N.

Given the above, the number of multiplications when using the conventional calculating device illustrated in FIG. 16 is $N^2+31N$.

Figure 9:
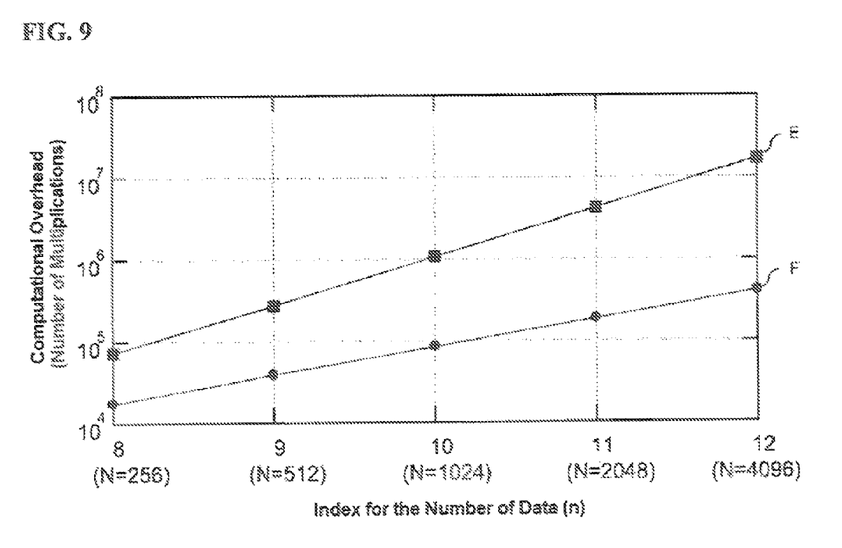
FIG. 9 is a graph comparing the computational overhead computational overhead in the conventional method and in the method of the form of an example.

FIG. 9 is a graph comparing the number of calculations in the calculating device in the present example (=8 Nn+4N) (F in FIG. 9) and the number of calculations in the case of using the conventional calculating device illustrated in FIG. 16 ($N^2+31N$) (E in FIG. 9). It can be seen that the number of multiplications when using the calculating device in the present form is small when compared to the number of multiplications in the case of using the conventional structure illustrated in FIG. 16. This means that the computational overhead in the calculating device in the present form of embodiment is small when compared to the computational overhead in the calculating device of the conventional structure.

CONCLUSION

As described above, in the calculating device in the present example according to the present invention, a Hilbert transform is performed after performing the Fourier transform, and an inverse Fourier transform is performed thereafter. This performs, in the calculating device according to the present form, through a Hilbert transform in the frequency domain, that which has been performed through a Hilbert transform in the time domain in the conventional calculating device illustrated in FIG. 16, and is a new concept not considered previously. This makes it possible to greatly reduce the computational overhead, as described above. The reduction in the computational overhead can contribute to a reduction in size, reduction in cost, reduction in power consumption, and the like, of the calculating device. Moreover, this enables an extension of the continuous operating time on batteries, and a reduction in the amount of heat produced, in a flow meter wherein this calculating device is a portion of the structure thereof. Furthermore, this enables a greater number of calculations to be performed when the scope of the calculating device is similar to that which is conventional. Doing so enables, for example, the timing between measurements in the flow meter to be reduced, making it possible to detect sudden changes in the flow rate.

Note that while the example set forth above illustrates an example wherein the calculating device is structured through a physical structure (a hardware structure), the processes in each of the portions in the calculating device may be embodied through software. Additionally, each of the structural elements of the calculating device may be structured from individual devices, or may be structured through a plurality of devices. For example, the calculating device may be structured from a single semiconductor chip, or may be structured from a plurality of semiconductor chips. Specifically, in the calculating device according to the present example of embodiment, the A/D converters 100 and 110, which handle analog signals, may be structured from elements that are separate from the structure that includes the Fourier transform portions 121 and 122.

The calculate device according to the present invention may be applied to, for example, a flow meter, typified by an ultrasonic flow meter. Furthermore, it may also be applied to electronic devices that measure time differences between inputted signals based on a plurality of inputted signals similar to those of a flow meter.

The invention claimed is:

1. A calculating device comprising:
   a first Fourier transform portion performing a Fourier transform on a first inputted signal;
   a second Fourier transform portion performing a Fourier transform on a second inputted signal;
   a complex conjugate deriving portion deriving a complex conjugate of the value outputted from the first Fourier transform portion;
   a multiplier multiplying the complex conjugate by the value outputted from the second Fourier transform portion, and for outputting the value after the multiplication;
   a Hilbert transform portion performing a Hilbert transform on the value after the multiplication;
   a first inverse Fourier transform portion performing an inverse Fourier transform on the value after multiplication;
   a second inverse Fourier transform portion performing an inverse Fourier transform on the value outputted from the first inverse Fourier transform portion;
   a phase relationship deriving portion deriving a phase relationship between the first inputted signal and the second inputted signal based on the value outputted from the first inverse Fourier transform portion and the value outputted from the second inverse Fourier transform portion; and
   a time difference deriving portion deriving the time difference between the first inputted signal and the second inputted signal based on the phase relationship.

2. The flow meter equipped with the calculating device as set forth in claim 1.

3. The flow meter as set forth in claim 2, comprising:
   a first signal transceiver and a second signal transceiver structured so as to be able to send signals to each other and receive signals from each other, wherein:
   the first signal transceiver and the second signal transceiver are provided at a distance from each other in a flow path wherein a specific medium flows; the first inputted signal is a signal that is transmitted from the second signal transceiver and received by the first signal transceiver;
   the second inputted signal is a signal that is transmitted by the first signal transceiver and received by the second signal transceiver; and a flow rate of the medium is calculated based on the derived time difference.

4. A calculating method comprising the steps of:
   a first Fourier transform step performing a Fourier transform on a first inputted signal;
   a second Fourier transform step performing a Fourier transform on a second inputted signal;
   a complex conjugate deriving step deriving a complex conjugate of the value obtained in the first Fourier transform step;
   a multiplying step multiplying the complex conjugate by the value outputted obtained in the second Fourier transform step, and for outputting the value after the multiplication;
   a Hilbert transform step performing a Hilbert transform on the value after the multiplication;
   a first inverse Fourier transform step performing an inverse Fourier transform on the value after multiplication;
   a second inverse Fourier transform step performing an inverse Fourier transform on the value obtained in the first inverse Fourier transform step;
   a phase relationship deriving step deriving a phase relationship between the first inputted signal and the second inputted signal based on the value obtained in the first inverse Fourier transform step and the value obtained in the second inverse Fourier transform step; and
   a time difference deriving step deriving the time difference between the first inputted signal and the second inputted signal based on the phase relationship.

* * * * *